US010541806B2

(12) United States Patent
Rosenoer

(10) Patent No.: US 10,541,806 B2
(45) Date of Patent: Jan. 21, 2020

(54) AUTHORIZING ACCOUNT ACCESS VIA BLINDED IDENTIFIERS

(71) Applicant: International Business Machines Corporation, Armonk, NY (US)

(72) Inventor: Jonathan M. C. Rosenoer, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 15/649,241

(22) Filed: Jul. 13, 2017

(65) Prior Publication Data
US 2019/0020468 A1 Jan. 17, 2019

(51) Int. Cl.
*H04L 29/06* (2006.01)
*H04L 9/06* (2006.01)
*H04L 9/32* (2006.01)

(52) U.S. Cl.
CPC ............ *H04L 9/06* (2013.01); *H04L 9/3242* (2013.01); *H04L 63/06* (2013.01); *H04L 63/08* (2013.01); *H04L 9/0643* (2013.01); *H04L 63/126* (2013.01)

(58) Field of Classification Search
CPC ......... H04L 9/06; H04L 9/3242; H04L 63/06; H04L 63/08; H04L 63/0414; H04L 63/101; H04L 9/3228; H04L 9/3231; H04L 9/3239; H04L 9/0643; H04L 2209/38; H04L 63/126
See application file for complete search history.

(56) References Cited

U.S. PATENT DOCUMENTS

| 10,075,298 | B2* | 9/2018 | Struttmann | G06F 21/64 |
| 10,303,887 | B2 | 5/2019 | Black et al. | |
| 2015/0120567 | A1* | 4/2015 | Van Rooyen | G06Q 20/3829 |
| | | | | 705/59 |
| 2017/0011460 | A1* | 1/2017 | Molinari | G06Q 40/04 |
| 2017/0206522 | A1* | 7/2017 | Schiatti | G06Q 30/00 |
| 2017/0235970 | A1 | 8/2017 | Conner | |
| 2017/0366547 | A1* | 12/2017 | Goldfarb | H04L 63/08 |
| 2018/0013567 | A1 | 1/2018 | Davis | |
| 2018/0144292 | A1* | 5/2018 | Mattingly | G06F 16/903 |
| 2018/0183587 | A1* | 6/2018 | Won | G06F 21/44 |

(Continued)

FOREIGN PATENT DOCUMENTS

WO 2017021154 2/2017

OTHER PUBLICATIONS

Kari Thor Runarsson et al., Pioneering Trusted Identity, Authenteq, Berlin—Reykjavik, https://angel.co/authenteq, Aug. 30, 2014.

(Continued)

*Primary Examiner* — Amir Mehrmanesh

(57) ABSTRACT

An example operation may include one or more of receiving a new identifier from a user device associated with a user account, creating a hash based on the new identifier, comparing the hash to a hash value associated with one or more identifiers stored in a blockchain, identifying a match of the hash and the hash value associated with the one or more identifiers, authorizing the user account, responsive to identifying the match of the hash and the hash value associated with the one or more identifiers, and deleting the hash, the new identifier, and the hash value associated with the one or more identifiers stored in the blockchain responsive to authorizing the user account.

20 Claims, 7 Drawing Sheets

(56) References Cited

U.S. PATENT DOCUMENTS

2018/0198617 A1\*   7/2018   Drouin .................. H04L 9/3213
2018/0225466 A1\*   8/2018   Ducatel ................ G06Q 20/065
2018/0285971 A1\*  10/2018   Rosenoer ............... G06N 20/00
2018/0349621 A1\*  12/2018   Schvey .................. G06F 21/40

OTHER PUBLICATIONS

Jon Southurst, BitID Will Verify Your Identity with the Bitcoin Blockchain, https://news.bitcoin.com/bitid-verify-id-bitcoin-blockchain/, Jul. 19, 2016.
FIDO Server Authentication, HYPR, 2017, https://www.hypr.com/fido-server/.

\* cited by examiner

AUTHORIZING ACCOUNT ACCESS VIA BLINDED IDENTIFIERS

TECHNICAL FIELD

This application generally relates to providing access to a service or transaction account, and more particularly, to authorizing account access via blinded identifiers.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

The information economy has generated an abundance of new online products and services. To authenticate users, organizations link their clients to unique identifiers. Because most users already possess an email addresses, service providers have found email to be a convenient way of identifying their clients, adapting their processes and record keeping in general. However, email addresses have rapidly become a target for hackers, who leverage them with privacy invasions, fraud, and other abusive activities. For example, thousands of employees at a major organization used customer email addresses to open unauthorized accounts. Given widely reported data breaches, reports of online surveillance by governments, social media, and advertising companies, online users/consumers are also increasingly sensitive to information leakage.

One approach is to require additional information (evidence) to verify or authenticate a user. Consumers, however, want to maximize control of their authentication information and minimize the risk of information leakage that compromises privacy. Similarly, consumers are concerned to minimize technology lock-in and maximize authentication portability.

SUMMARY

One example embodiment may provide a method of operation which includes one or more of receiving a new identifier from a user device associated with a user account, creating a hash based on the new identifier, comparing the hash to a hash value associated with one or more identifiers stored in a blockchain, identifying a match of the hash and the hash value associated with the one or more identifiers, authorizing the user account, responsive to identifying the match of the hash and the hash value associated with the one or more identifiers, and deleting the hash, the new identifier, and the hash value associated with the one or more identifiers stored in the blockchain responsive to authorizing the user account.

Another example embodiment of operation may include an apparatus that includes a receiver configured to perform one or more of receive a new identifier from a user device associated with a user account, and a processor configured to create a hash based on the new identifier, compare the hash to a hash value associated with one or more identifiers stored in a blockchain, identify a match of the hash and the hash value associated with the one or more identifiers, authorize the user account, responsive to identifying the match of the hash and the hash value associated with the one or more identifiers, and delete the hash, the new identifier, and the hash value associated with the one or more identifiers stored in the blockchain responsive to authorizing the user account.

Still another example embodiment may include a non-transitory computer readable storage medium configured to store instructions that when executed cause a processor to perform one or more of receiving a new identifier from a user device associated with a user account, creating a hash based on the new identifier, comparing the hash to a hash value associated with one or more identifiers stored in a blockchain, identifying a match of the hash and the hash value associated with the one or more identifiers, authorizing the user account, responsive to identifying the match of the hash and the hash value associated with the one or more identifiers, and deleting the hash, the new identifier, and the hash value associated with the one or more identifiers stored in the blockchain responsive to authorizing the user account.

DETAILED DESCRIPTION

Figure 1A:
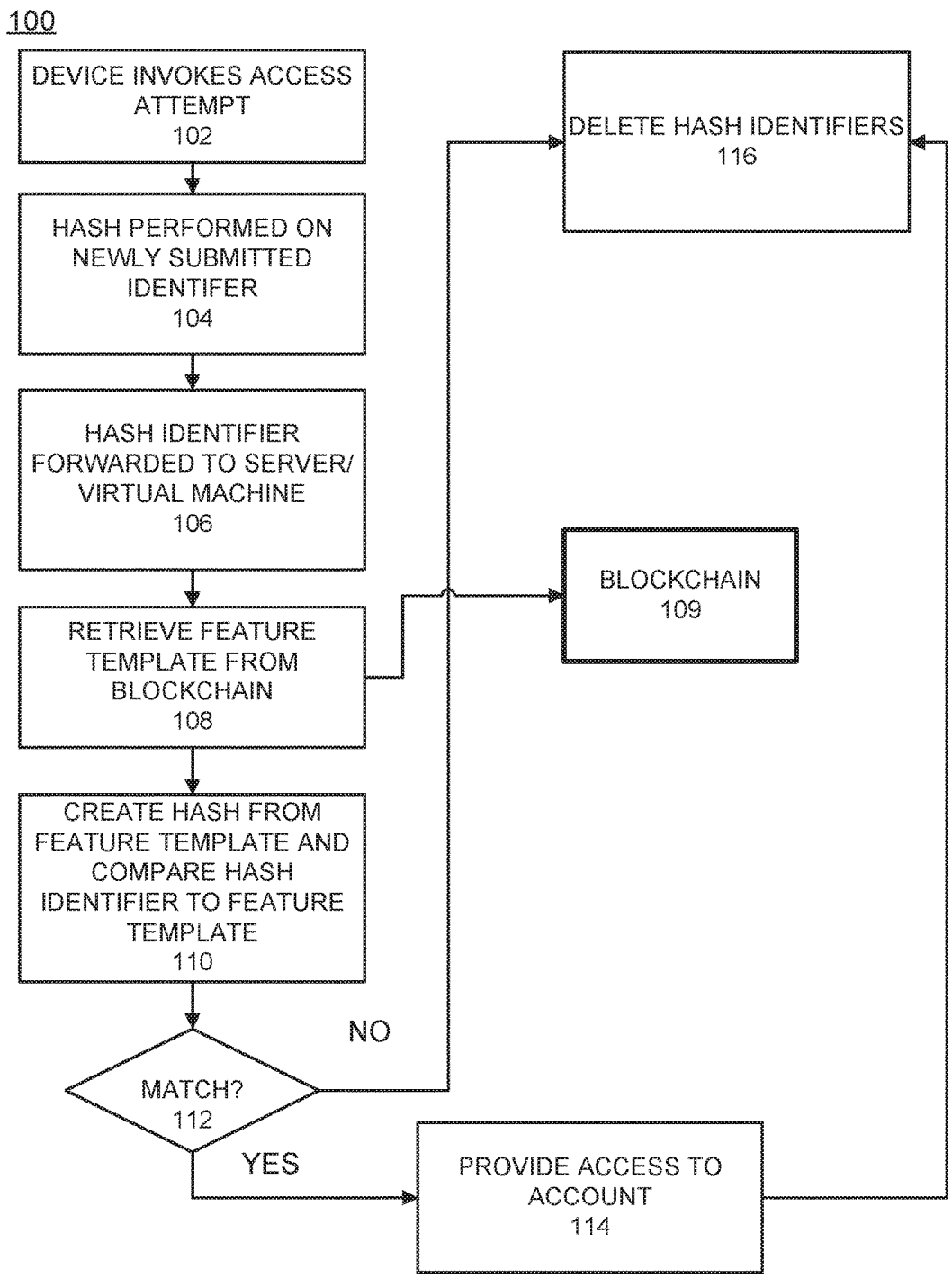
FIG. 1A illustrates a logic flow diagram of access authorization via blockchain information matching, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to providing access to a service or transaction account, and in another embodiment relates to using a blinded procedure in a blockchain to optimize security and perform authorizing account access via self-deleting blinded identifiers.

Example embodiments provide a user-controlled blinded identity verification which uses a one-time, short-lived and self-deleting identity verification data. Also, the configuration further provides using a decentralized (i.e., peer-to-peer), distributed data structure (ledger) technology (e.g., blockchain).

In one example implementation, an organization opens an account for a user/consumer and verifies the consumer's identity using one of various different approaches, such as regulatory prescribed know your customer (KYC) processes. The organization then offers the consumer a range of exogenous dynamic identifiers which may be required to be provided, and which may leverage the consumer's smartphone functions, such as a camera or microphone, in order to authenticate the consumer on future services and transaction requests. The identifiers may include correlated spatio-temporal sensor inputs from the user's mobile device, such as combined behavioral and environmental biometrics. Some examples may include but are not limited to a fingerprint, facial image data, audio data, video data, textual data, location data (i.e., GPS, geo-location), and sensor data.

In operation, the organization stores in a permissioned blockchain the verified consumer identity information along with descriptions, including feature templates, of the agreed exogenous dynamic identifiers that will be used by the consumer. When the consumer later requests a service (e.g., account information modification) or transaction (e.g., wire transfer), the request will trigger an identity authentication process, to which the consumer will respond by using the smartphone to dynamically create one or more agreed identifiers. Such identifiers are then blinded using feature templates and a hash function, which generates a cryptographically secure one-time identity authentication message (i.e., in the form of a hash) that is sent to the blockchain. As the authentication message is created, the dynamically created identifiers are deleted from the smartphone.

FIG. 1A illustrates a logic flow diagram of access authorization via blockchain information matching, according to example embodiments. Referring to FIG. 1A, the flow diagram 100 provides a process of a device attempting to access an account which is already setup. The device may begin with invoking an access attempt 102 and performing a hash on a newly submitted identifier 104. The new identifier may be an attempt by the user of the user device to send an authenticating identifier contemporaneous with an access or login attempt. For example, the user may desire to update some information or check an account status, the user may take a picture of his or her face at a particular location, the identifier information submitted may, in turn, include the image of the user's face and a particular location. The information submitted is hashed and sent to a blockchain accessible device, such as a computing platform in the cloud, a server at an institution organization site, or other processing platform.

Continuing with the same example, the hash of the identifiers is received and processed by the computing platform 106, which retrieves 108 the known data from the blockchain 109. The data stored may be in the form of a data/feature template, which may include the characteristics of a digital rendition and/or fingerprint that can be matched to the user submitted data. For example, in the event of facial recognition from a photograph image, the digital representation of the user's face may be stored in the data template, and another photograph submitted at a later time can be processed and compared to that previously stored data to determine whether there is a match. Specifically, the hash of the submitted identifier(s) is compared 110 to a hash of the stored identifier and a match 112 is produced or not depending on the results of the comparison. Regardless of the result, the hash identifiers 116 are deleted. However, if the match is made, the account may be accessed 114 by the requesting entity (i.e., user device). If the hashes match, then the service or transaction request is authenticated, as to identity, and is authorized to proceed via a cryptographically secure message sent to the associated service or transaction provider. As soon as the identity authentication match process is concluded, the hashes (of the submitted identifier and the stored identifier) are deleted and disappear. If the match process does not occur or does not proceed within a defined short time limit, all authentication identifier parameters self-delete and disappear.

The above processes to trigger the identity authentication process and to match identity identifiers are executed via the blockchain platform's virtual execution environment, which executes the associated logic stored in the blockchain platform by means of a "smart contract" or chaincode. The blockchain also stores an associated audit trail for reference purposes. The blockchain is configured in this implementation to support 'n'-to-'n' relationships and portability across various platforms so that the customer can utilize the identity information and agreed identifiers stored in the blockchain, as well as the identity authentication process, with institutions other than the organization that originally verified the user's identity and stored this information in the blockchain.

In this example implementation, an organization may setup an account for a user/consumer and specify a range of exogenous dynamic identifiers that will be stored in the data template. The organization then loads a description of the identifiers into the blockchain or related processing platform (VM). The user, seeking to access the account to execute a service, can then trigger the authentication process by using their device (i.e., smartphone) to create a one-time identifier, which is converted to a hash and sent to the blockchain VM. The hash identifier is received by the blockchain VM, which converts the relevant identifiers from the data template stored in the blockchain to another hash identifier. The received hash identifier is compared to the hash generated from the associated identifier stored by the organization in the blockchain. If the values match, then the service requested by the user is unlocked. The hashes generated in the confirmation process are destroyed after comparisons are performed. In this example implementation, a global footprint may be made available as the blockchain has a global footprint operated at permissioned network edges, also trust may be established as the organization is required by regulation to knows its customer and its verification can be accepted across a permissioned network. Other attributes may include ownership and organization, which maintains customer ownership as well as auditability since an audit trail is secure and available for regulatory compliance review. A counter-fraud measure may provide changes which can be replicated across the network with very low latency. User-driven control may place the customer/user in control of their own account information. Additional attributes may provide privacy protection and verification data, which will disappear after authorization efforts. Also, the simplicity may provide easy-to-use functions (i.e., camera, microphone).

When creating the hash from the data template and performing the comparison, all data related to the transaction may self-delete based on a time limit, success and/or failure of the matching function. For example, a user's facial image and geography, such as 'my house', 'my neighborhood', based on a GPS location of a user's smartphone, can be compared to the feature template data, once hashed, to confirm a match or no match. In operation, the source data (e.g., facial image) is mapped and completes a template, which then is transformed into a hash that is sent to the organization's blockchain, shortly thereafter, the hash identifier is deleted along with the hash of the data template (either physically or, e.g., via use of a one-time encryption key). In this example, the consumer's identifiers are blinded and self-deleting. Blinded may be interpreted as a hash that stands in place of the original identifier, which is then matched with a blinded identifier, such as a hash from the blockchain. All hashes and the associated information are self-deleting, either upon use of and/or within a specific and short time period.

Figure 1B:
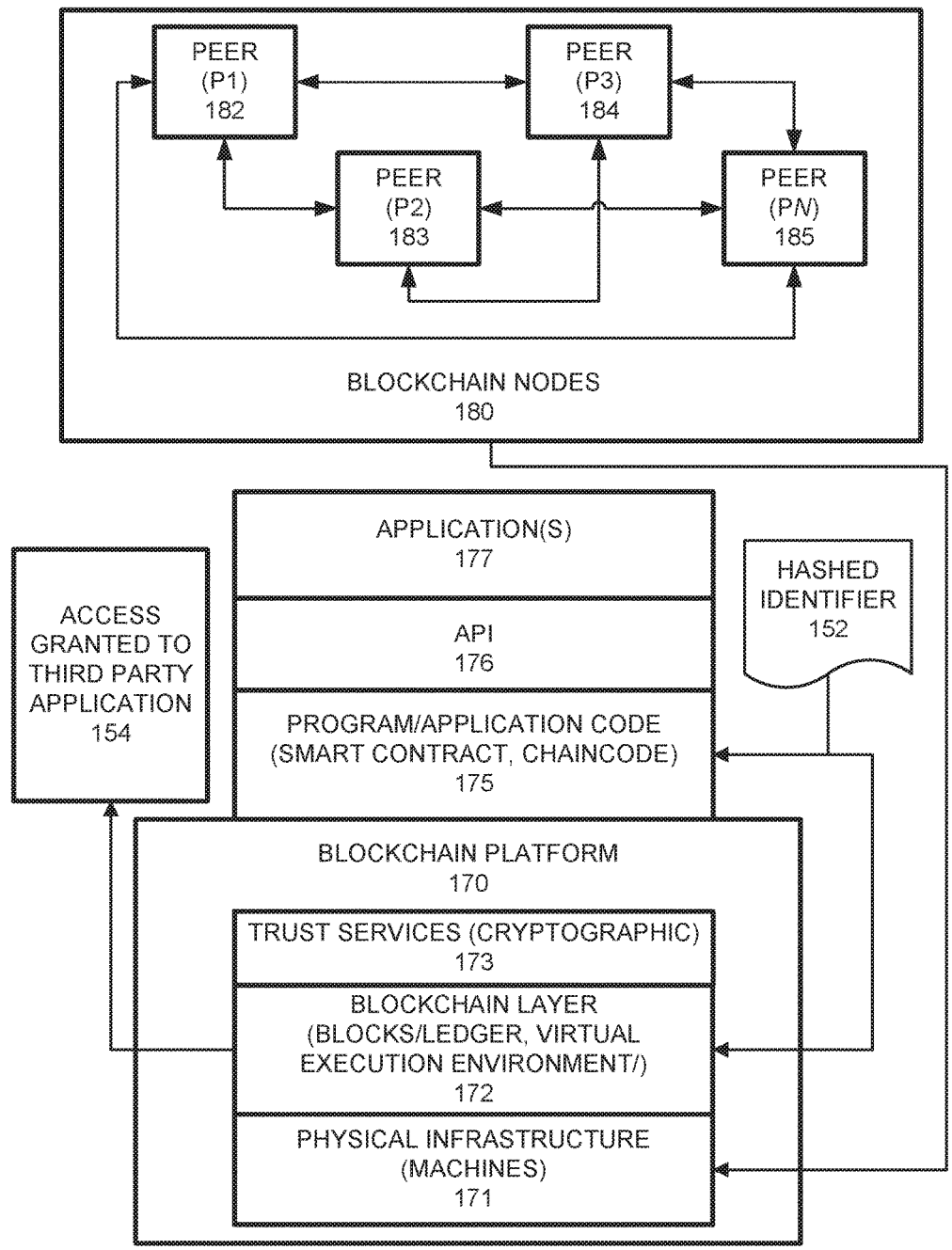
FIG. 1B illustrates a blockchain system configuration, according to example embodiments.

FIG. 1B illustrates a blockchain system configuration according to example embodiments. The blockchain system 150 may include certain common blockchain elements, such as a group 180 of assigned peer blockchain nodes 182-185 which participate in the blockchain transaction addition and validation process (consensus). Any of the blockchain peer nodes 180 may initiate new transactions and seek to write to the blockchain immutable ledger 172, a copy of which is stored on the underpinning physical infrastructure 171. In this configuration, the customized blockchain configuration may include one or applications 177 which are linked to APIs 176 to access and execute stored program/application code (e.g., chain code and/or smart contracts) 175, which are created according to the customized configuration sought by the participants and can maintain their own state, control its own assets, and receive external information. This code can be deployed as a transaction and installed, via appending to the distributed ledger, on all blockchain peer nodes.

The blockchain base 170 includes the various layers of blockchain data, services (e.g., cryptographic trust services, virtual execution environment), and underpinning physical computer infrastructure necessary to receive and store new transactions and provide access to auditors which are seeking to access data entries. The blockchain layer 172 exposes an interface that provides access to the virtual execution environment necessary to process the program code and engage the physical platform 171. Cryptographic trust services 173 are used to verify transactions and keep information private.

The blockchain configuration of FIG. 1B may process and execute program/application code 175 by way of the interfaces exposed, and the services provided, by blockchain platform 170. The code may control blockchain assets, for example, it can store and transfer data, and may be executed by the blockchain, for example, in the form of a smart contract and associated chain code with conditions or other code elements subject to its execution. The smart contracts 175 may be created to execute reminders, updates, and/or other notifications subject to the changes, updates, etc. The smart contracts can themselves be used to identify rules associated with authorization and access requirements and usage. For example, the hashed identifier information received 152 from the user device may be processed by one or more processing entities (virtual machines) 172. The result may include access being granted 154 to a third party application from the blockchain computing environment (VM). In this example, the previously known user identifiers or data template information may be stored in the blockchain 170. The physical machines 171 may be accessed to retrieve the user device template and the information can be used to match against incoming user identifiers for verification purposes.

Within the chaincode, a smart contract may be created via a high-level application and programming language, then converted to a string that is written to a block in the blockchain. The smart contract is invoked by a user device submitted operation. The smart contract may write data to the blockchain in the format of key-value pairs. Later, the smart contract code can read the values stored in the blockchain and use them in application operations. The smart contract code can write the output of various logic operations into the blockchain. The code may be used to create a temporary data structure in a virtual machine or other computing platform. Data written to the blockchain can be public or can be encrypted and maintained as private. The temporary data that is used/generated by the smart contract is held in memory by the supplied execution environment, then deleted once the data needed for the blockchain is identified.

The chaincode is the code interpretation of the smart contract, with additional features. A chaincode is program code deployed on the network, where it is executed and validated by chain validators together during a consensus process. In operation, a user submits a service request and that service request triggers smart contract authentication routine via chaincode. The user may use smartphone functions to create an identifier (e.g., photo of face, fingerprint, etc.). The details of this identifier are extracted via a feature extractor and are mapped to data in data template, which is then transformed to a hash. The hash is then transmitted to the blockchain and/or smart contract. The chaincode receives the hash and retrieves from the blockchain a hash associated with the data template created by use of a previously stored client identifier and feature extractor. The details of the chaincode process 163 (see FIG. 1C) provides for retrieving the user profile, extracting the identifier template data, converting that data to a hash, and comparing the templated data to the hash identifier sent from the user device and determining if a match is present. If the hashes of the hash identifier and the hash created from the stored identifier template data match, then the chaincode sends an authorization key to the requested service. The chaincode writes to the blockchain data including the following and associated cryptographic details: time stamp for the authorization, identification of the user, identification of the identifier types utilized and matched, identification of the service authorized, and identification of the chaincode invoked.

Figure 1C:
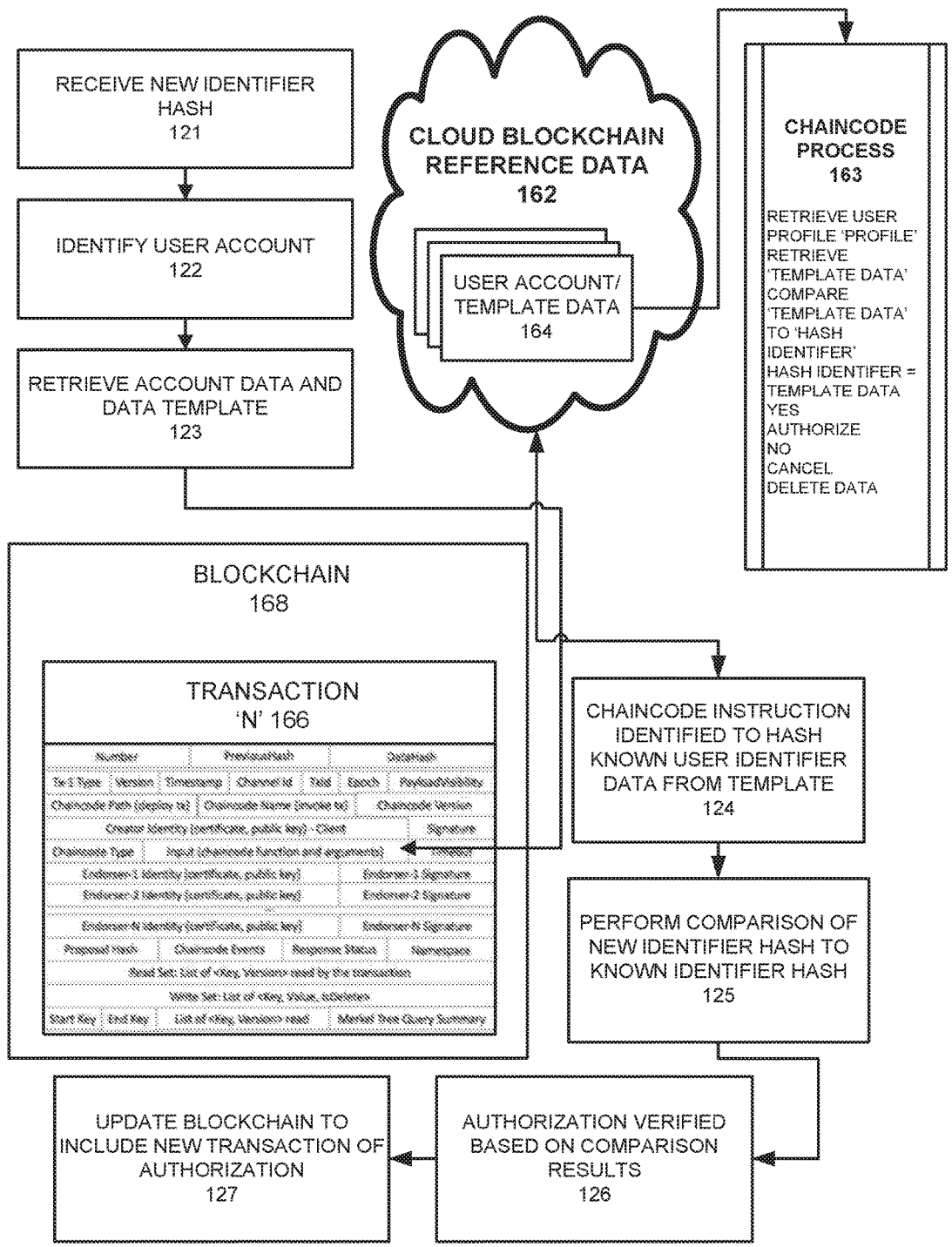
FIG. 1C illustrates an example blockchain configuration for performing the authentication procedure according to example embodiments.

In FIG. 1C, the process 160 provides for receiving the new identifier hash 121, identifying a user account 122, retrieving the account data and the data template 123 that will be used to compare to the new identifier hash, a chaincode instruction to hash the known user data template data 124 and compare the data 125 to the received data identifier hash. The result yields a match 126 and authorization 127, which includes updating the blockchain for the recent authorization attempt. The chaincode is identified from a blockchain 168 block/transaction 166 and either processed in a remote cloud server 162 based on the data in the user account, the template data 164 and the chaincode extracted from the block/transaction 166. The chaincode process 163 is a temporary process that includes the chain code operations and logic necessary to yield a result.

Figure 2:
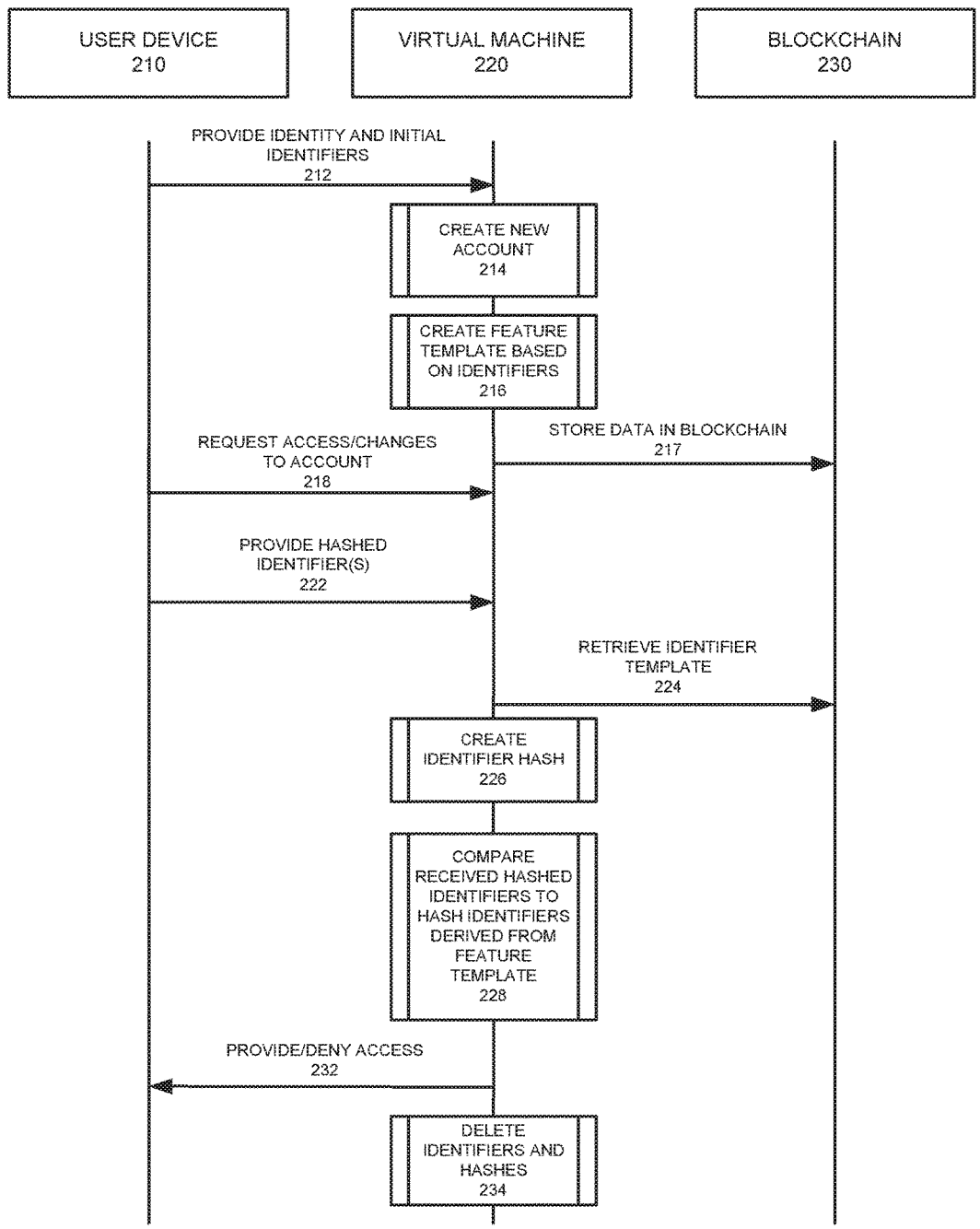
FIG. 2 illustrates a system messaging diagram of the interactions between a user device, a processing platform and a blockchain, according to example embodiments.

FIG. 2 illustrates a system messaging diagram of the interactions between a user device, a processing platform and a blockchain, according to example embodiments. Referring to FIG. 2, the system 200 may include a number of components or modules which may include software, hardware or the combination of both. The components may include a first component, such as a user device 210 and a second component, such as virtual machine 220, which interfaces with the user device and a third component, such as a blockchain 230. In this example, the identifier(s) 212 may be sent from the user device to a virtual machine 220 managed by an organization which uses a blockchain 230. The necessary information is used to create a new account 214 and to create a customized feature template based on those identifiers 216. The information is stored 217 in the blockchain 230. Subsequently, in another operation and perhaps at a later time, the user device may submit a request to access, make changes, update, etc., the account 218. The identifiers may be provided by the user device 222 based on a prompt or other selection function. The virtual machine or similar computing platform may retrieve the data identifier template 224 and create the hashed identifiers 226 and use them to compare 228 to the hashed data provided by the user device. The decision is then rendered to allow or not allow the access requested 232. The decision is based on a match result of hash received to hash of known data in the blockchain. All such information is deleted 234 to reduce the likelihood of information fraud by unwarranted third parties.

In one embodiment, the first component, the second component and the third component may be separate devices such as servers, computers or other computational devices or may be a single device. In other embodiments, the first component and the second component may be enclosed as, or perform as, a single device, the first component and the third component may be enclosed as, or perform as, a single device, and the second component and the third component may be enclosed as, or perform as, a single device. The components or devices 210, 220 and 230 may be directly connected or communicably coupled to one another, in a wired or wireless manner, and may reside locally and/or remotely.

In another example embodiment, the user/consumer opens an account with an organization that is a member of the blockchain (e.g., an airline organization) and authorizes the use of the user identity information and identifiers stored in the blockchain by a first member, such as a different organization, to authenticate the user. In this example, the consumer has portability of his or her identity and identity authentication across a network or ecosystem that is created on the blockchain (e.g., retail organization, service account, airline, hotel, auto rental, etc.). The verified identity information could be shared from one organization to the next, and the user may be authenticated by means of the blockchain and the identifier information stored by the first member operating on behalf of the second member based on access rights provide by the user and the first member. All operations performed by the virtual machine, all message sent and all information retrieved are protected by strong cryptographic measures.

Figure 3A:
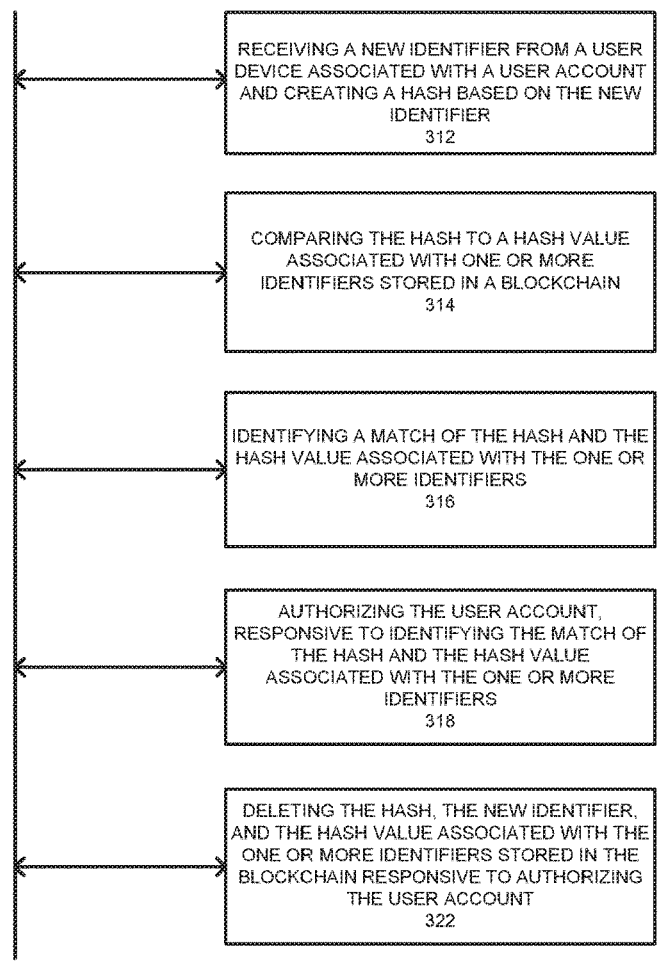
FIG. 3A illustrates a flow diagram of an example method of managing account access via a blockchain, according to example embodiments.

FIG. 3A illustrates a flow diagram of an example method of managing account access via a blockchain, according to example embodiments. Referring to FIG. 3A, the method 300 may include receiving a new identifier from a user device associated with a user account and creating a hash based on the new identifier 312, comparing the hash to a hash value associated with one or more identifiers stored in a blockchain 314, identifying a match of the hash and the hash value associated with the one or more identifiers 316, authorizing the user account, responsive to identifying the match of the hash and the hash value associated with the one or more identifiers 318, and deleting the hash, the new identifier, and the hash value associated with the one or more identifiers stored in the blockchain responsive to authorizing the user account 322.

Figure 3B:
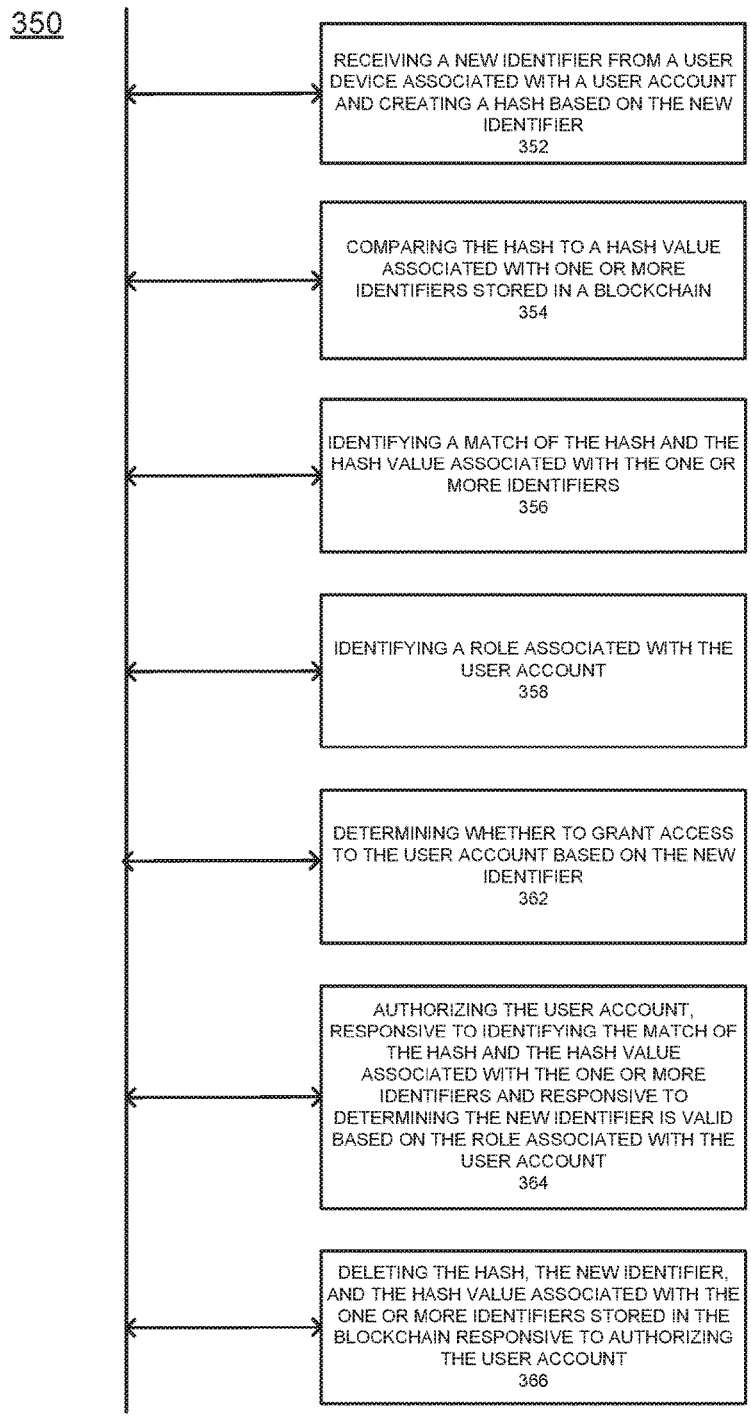
FIG. 3B illustrates another flow diagram of an example method of managing account access via a blockchain, according to example embodiments.

FIG. 3B illustrates another flow diagram of an example method of managing account access via a blockchain, according to example embodiments. The method 350 may also include receiving a new identifier from a user device associated with a user account creating a hash based on the new identifier 352, comparing the hash to a hash value associated with one or more identifiers stored in a blockchain 354, identifying a match of the hash and the hash value associated with the one or more identifiers 356, identifying a role associated with the user account 358, determining whether to grant access to the user account based on the new identifier 362, authorizing the user account, responsive to identifying the match of the hash and the hash value associated with the one or more identifiers and responsive to determining the new identifier is valid based on the role associated with the user account 364, and deleting the hash, the new identifier, and the hash value associated with the one or more identifiers stored in the blockchain responsive to authorizing the user account 366.

In this example, role-based access control may be introduced to regulate access to resources based on defined consumer roles. A role is a definition of a class of access for one or more users and can include a definition of access permissions, resources and related privileges. Using role-based access control simplifies access control management for resource providers by requiring only consumer role associations and role definitions. However, the distributed nature of computer systems and computing resources means that computing solutions are increasingly no longer under common or centralized control or administration. For example, cloud computing services can include multiple computing resources distributed across potentially many physical and/or virtualized computer systems. The roles may require certain inputted identifiers. For example, a user may have a role that is elevated, such as an intermediate or high level access role. That elevated status or role may require additional identifiers or user submitted information prior to authorizing the user access attempt. For instance, additional identifiers, specific identifiers, etc. If those identifiers required for the assigned role are not received, then the user device may only be granted a basic role of access which may limit access rights to various changes, options, documents, etc.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
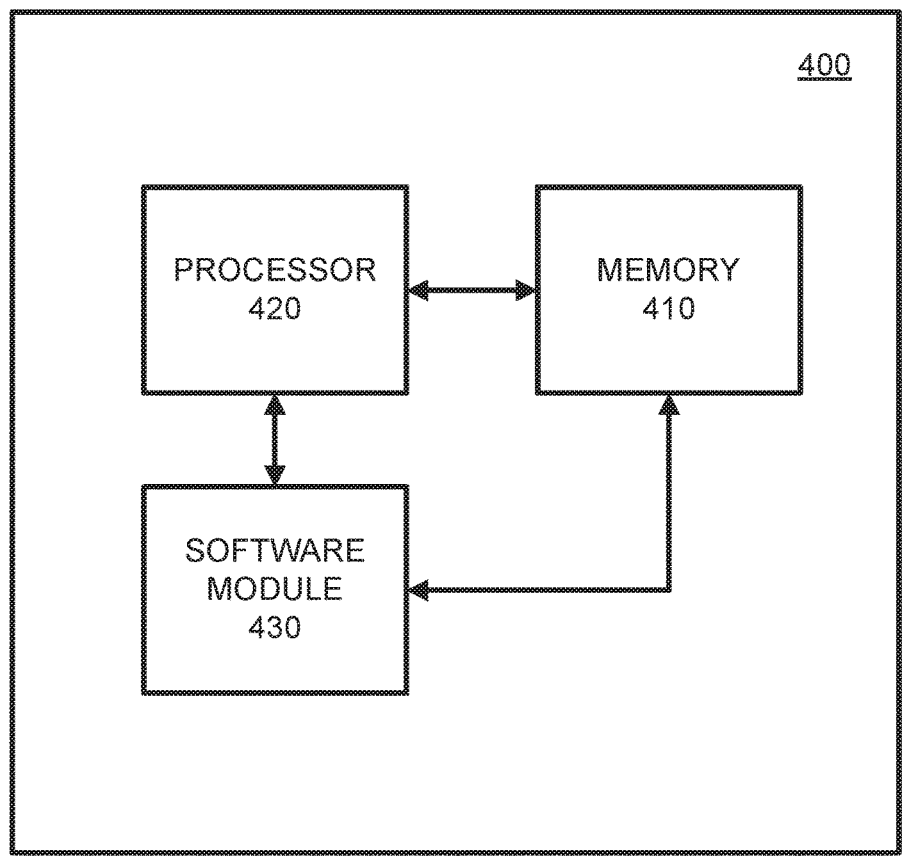
FIG. 4 illustrates an example network entity configured to support one or more of the example embodiments.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a new identifier from a user device associated with a user account;
   creating a hash based on the new identifier;

comparing the hash to a hash value associated with one or more identifiers stored in a blockchain;

identifying a match of the hash and the hash value associated with the one or more identifiers;

authorizing the user account, responsive to identifying the match of the hash and the hash value associated with the one or more identifiers; and deleting the hash, the new identifier, and the hash value associated with the one or more identifiers stored in the blockchain responsive to authorizing the user account.

2. The method of claim 1, further comprising:

receiving the one or more identifiers associated with the user account; and storing the one or more identifiers in the blockchain.

3. The method of claim 1, further comprising:

receiving a request to update the user account; and receiving another hash from the user device.

4. The method of claim 3, further comprising:

comparing the another hash to the hash value associated with the one or more identifiers; and permitting the update to the user account, responsive to identifying a match of the another hash and the hash value associated with the one or more identifiers.

5. The method of claim 4, further comprising:

storing the update in the blockchain.

6. The method of claim 1, wherein the new identifier is created responsive to a user account access operation.

7. The method of claim 1, wherein the one or more identifiers comprise one or more of a user name, password, photograph, image data, audio data, video data, textual data, location data, and sensor data.

8. An apparatus, comprising:

a receiver configured to receive a new identifier from a user device associated with a user account; and a processor configured to:

create a hash based on the new identifier;

compare the hash to a hash value associated with one or more identifiers stored in a blockchain;

identify a match of the hash and the hash value associated with the one or more identifiers;

authorize the user account, responsive to identifying the match of the hash and the hash value associated with the one or more identifiers; and delete the hash, the new identifier, and the hash value associated with the one or more identifiers stored in the blockchain responsive to authorizing the user account.

9. The apparatus of claim 8, wherein the receiver is further configured to receive the one or more identifiers associated with the user account, and the processor is further configured to store the one or more identifiers in the blockchain.

10. The apparatus of claim 8, wherein the receiver is further configured to receive a request to update the user account, and receive another hash from the user device.

11. The apparatus of claim 10, wherein the processor is further configured to:

compare the another hash to the hash value associated with the one or more identifiers; and permit the update to the user account, responsive to identifying a match of the another hash and the hash value associated with the one or more identifiers.

12. The apparatus of claim 11, wherein the processor is further configured to:

store the update in the blockchain.

13. The apparatus of claim 8, wherein the new identifier is created responsive to a user account access operation.

14. The apparatus of claim 8, wherein the one or more identifiers comprise one or more of a user name, password, photograph, image data, audio data, video data, textual data, location data, and sensor data.

15. A non-transitory computer readable storage medium configured to store instructions that when executed cause a processor to perform:

receiving a new identifier from a user device associated with a user account;

creating a hash based on the new identifier;

comparing the hash to a hash value associated with one or more identifiers stored in a blockchain;

identifying a match of the hash and the hash value associated with the one or more identifiers;

authorizing the user account, responsive to identifying the match of the hash and the hash value associated with the one or more identifiers; and deleting the hash, the new identifier, and the hash value associated with the one or more identifiers stored in the blockchain responsive to authorizing the user account.

16. The non-transitory computer readable storage medium of claim 15, wherein the processor is further configured to perform:

receiving the one or more identifiers associated with the user account; and storing the one or more identifiers in the blockchain.

17. The non-transitory computer readable storage medium of claim 15, wherein the processor is further configured to perform:

receiving a request to update the user account; and receiving another hash from the user device.

18. The non-transitory computer readable storage medium of claim 17, wherein the processor is further configured to perform:

comparing the another hash to the hash value associated with the one or more identifiers; and permitting the update to the user account, responsive to identifying a match of the another hash and the hash value associated with the one or more identifiers.

19. The non-transitory computer readable storage medium of claim 18, wherein the processor is further configured to perform:

storing the update in the blockchain.

20. The non-transitory computer readable storage medium of claim 15, wherein the new identifier is created responsive to a user account access operation, and wherein the one or more identifiers comprise one or more of a user name, password, photograph, image data, audio data, video data, textual data, location data, and sensor data.

* * * * *